Oct. 13, 1925.
G. L. TULLY
1,557,120
SPECTACLE TEMPLE
Filed April 10, 1922
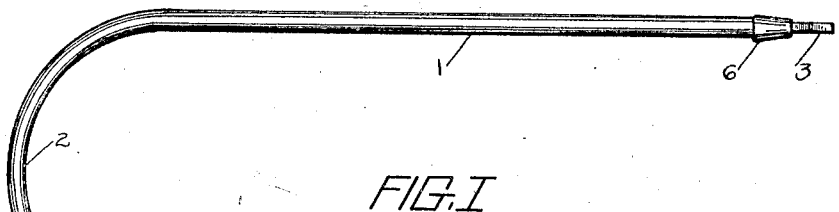
FIG. I
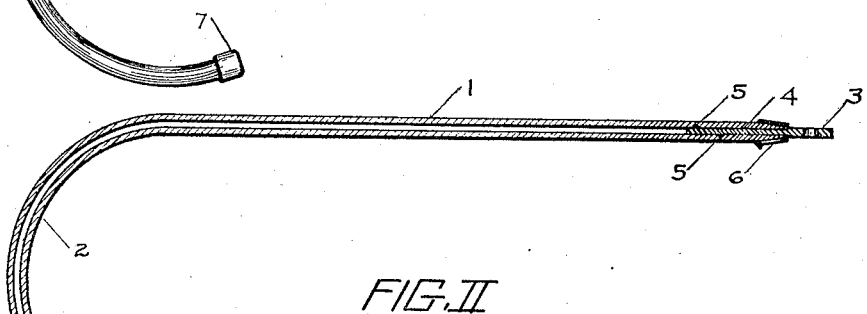
FIG. II
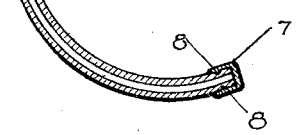   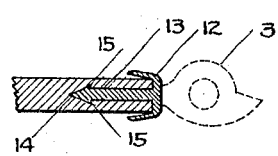   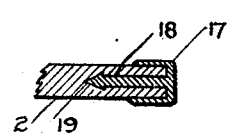
FIG. III          FIG. IV          FIG. V
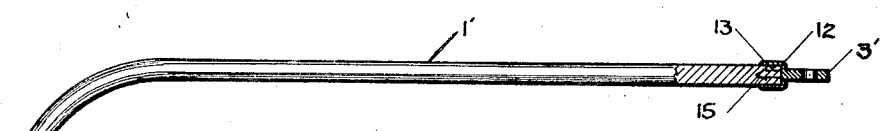
FIG. VI
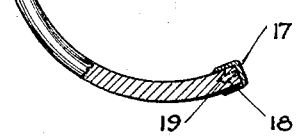
INVENTOR
GEORGE L. TULLY.
BY
H. H. Styll & H. H. Parsons.
ATTORNEYS Patented Oct. 13, 1925.

1,557,120

UNITED STATES PATENT OFFICE.

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

SPECTACLE TEMPLE.

Application filed April 10, 1922. Serial No. 551,125.

*To all whom it may concern:*

Be it known that I, GEORGE L. TULLY, a citizen of the United States, residing at Southbridge, in the county of Worcester and State of Massachusetts, have invented certain new and useful Improvements in Spectacle Temples, of which the following is a specification.

This invention relates to new and useful improvements in spectacle temples and more particularly to that type of temple formed of tubular flexible non-metallic material. The main object of this invention is the construction of a temple of this type wherein the usual metal re-inforcement is eliminated to provide a more flexible earpiece and at the same time retain its proper shape for engagement with the ear of the wearer.

Another object of this invention is the provision of a tubular non-metallic temple wherein the head portion of the temple which is usually formed upon the end of the re-inforcement is, in the present instance formed upon the end of a short piece of metal and which is embedded within the end of the tubular temple piece thus eliminating the necessity of extending the metal through the entire length of the tubular piece.

A still further object of the invention is the provision of a non-metallic tubular temple wherein the end piece connected to the usual dowel is formed upon the outer end of a piece of metallic re-inforcement inserted into the end of the side piece of the temple and attached thereto in any suitable manner while the tip of the earloop is provided with suitable metal re-inforcement to prevent any breaking or splitting on the part of the tubular material.

A still further object of the invention is the provision of a flexible metallic tubular temple member having the usual head piece attached to the end of the side portion of the temple in a novel manner whereby to eliminate the necessity of extending the metal re-inforcement entirely through the tubular part of the temple and also provides a metal protector for the end of the earloop for protecting the same against breakage or splitting on the part of the material.

With the above objects in view the invention consists in the novel features of construction together with the combination and arrangement of parts pointed out in the claims and shown in the accompanying drawing, in which—

Figure I is a side elevation of a temple constructed in accordance with the invention.

Figure II is a longitudinal sectional view.

Figure III is a detail longitudinal sectional view illustrating a modified form of the invention.

Figure IV is a similar view illustrating another form of the invention.

Figure V is a longitudinal sectional view illustrating still another form of the invention.

Figure VI is longitudinal sectional view of another form of the invention.

Referring now more particularly to the drawings in which similar characters are embodied to denote parts throughout the several views, the numeral 1 designates the side portion of a non-metallic temple having the earloop 2 formed at one end thereof. In order to attach the head piece 3, which is connected to the temple dowel, to the side portion of the temple, the head portion 3 has formed integral therewith a shank portion or stem which is fitted into the end of the side portion 1 and secured in position in any well known manner. In the present instance I have illustrated the shank portion 4 as provided with outstanding spur members 5 and embedded within the side walls of the opening within the temple to retain shank 4 in position.

In order, therefore, to have the above arrangement properly put together so as to provide for a maximum strength at this point, it is preferred to have the shank portion 4 inserted within the tubular temple piece, while the temple piece is in a slightly heated condition and as the shank has been pushed within the end of the temple, the non-metallic material surrounding the shank will be forced inwardly toward the shank so as to thoroughly embed the spur members 5 within the material and at the same time produce a slightly tapered outer face at the end of the temple.

If found desirable a metallic outer cap 6 can be arranged over the non-metallic material whereby to prevent the material at this end, where considerable stress and strain is applied, from breaking or splitting, which would release the shank member 4 from the end of the temple piece. Heretofore it has been the usual custom in the construction of temples of this character to extend the metallic re-inforcement through the entire tubular portion of the temple whereby to reinforce the tubular material and at the same time provide for the proper flexibility within the earloop 2, but in the present instance the metallic re-inforcement has been eliminated and in order to protect the end of the earloop 2 so as to prevent the same from becoming broken or split during usage I provide a metallic re-inforcement which in the main embodiment of the invention is shown as a metal cap member 7, the cap member preferably being formed of the same material as the head portion 3 and shank 4. The cap 7 is provided upon its interior with the spur members 8 which when the cap is attached to the end of the earloop, are embedded within the non-metallic material, as shown in Figure II to retain the cap member 7 securely in position upon the end of the earloop 2.

In Figure III I have illustrated a modified form of the invention wherein the end of the earloop is protected by providing a head piece 9 which is of the same diameter as the end of the earloop and is provided with a stem portion which extends into the tubular portion of the loop 2. The inner end of said stem is provided with spurs or prongs 11 which, as will be noticed, will permit the stem 10 to be driven into the tubular end of the loop but will engage with the inner wall of the bore whereby to prevent the stem 10 from being withdrawn. In this form of the invention the head portion 9 will form a suitable protection for the end of the tubular earloop whereby to prevent the same from being accidently broken or split, and the stem 10 with its spur members 11 will retain this head 9 in position against the end of the loop.

In Figure IV I have illustrated another form of the invention disclosing a novel way of attaching the head member 3 to the end of the side portion and in this form of the invention the metal cap 12 is provided with a centrally arranged stem 13 having a penetrating point 14 upon its inner end while shoulders 15 are formed upon the stem at a point removed from the penetrating point 14 whereby when the stem 13 is forced into the tubular nonmetallic material, the point 14 will permit the stem to be readily inserted therein while the shoulders 15 will prevent the same from being withdrawn. In this form of the invention the cap member 12 is formed with its walls slightly tapered so that the stem 13 can be readily inserted within the end of the side portion of the temple and by means of any suitable type of clamp member the walls of the cap can be forced into engagement with the exterior of the temple and during this clamping process the non-metallic material will be forced into engagement with the substantially arrow shaped head of the stem 13 so as to securely retain the cap member 12 in position upon the end of the temple.

It is preferred to have the head piece 3' formed integral with the cap member 12 and disposed in alignment with the stem 13. From this it will be apparent that an unusually strong connection is provided for between the head piece 3' and the end of the side piece of the temple and at the same time providing for proper re-inforcement for the non-metallic material.

In Figure V I have illustrated another form of the invention which discloses a cap member for protecting the end of the loop 2. This cap member 17 illustrated in Figure V is preferably formed with its side wall tapered and with a central stem 18 formed upon the interior of the cap, the outer end of said stem being provided with a substantially arrow shaped head 19 whereby when the cap member 17 is placed in position upon the end of the earloop 2 and by means of clamping pressure the side walls of the cap 17 are brought into close engagement with the material of the earloop, the spur portions of the head 19 embedding themselves within the non-metallic material of the earloop, whereby the cap 17 will be securely retained in position upon the end of the earloop.

From the above description taken in connection with the accompanying drawings it will be readily apparent that I have provided a new and desirable temple of non-metallic material and of tubular construction wherein the usual metallic re-inforcement is eliminated and I have provided novel means for attaching the usual head number to the temple and wherein additional means is provided for embracing and protecting the end of the earloop whereby to prevent the material from breaking or splitting at this point. It will also be apparent that I have provided a temple formed of non-metallic material which possesses the usual flexibility provided for in temples of this type wherein metallic reinforcing wire is extended throughout the length of the temple.

In Figure VI I have illustrated a solid non-metallic temple member instead of tubular or coreless as in the preferred form and in this form the cap member 12 is attached to the end of the side piece 1' by having the penetrating prong 15 driven into the end of the temple and the cap member then clamped tightly onto the exterior of the temple.

The end of the ear loop is also provided with the protecting cap 17 and is applied by having the penetrating prong 19 driven into the end of the ear loop and the cap then clamped tightly onto the end of the loop to retain the same in place.

Other ways and means may be employed for securing the cap members 12 and 17 in place in this form of the invention such as drilling the ends of the side portion and ear loop and inserting the pronged shanks within the drills.

What I claim is,

A one-piece terminal fitting for the end of a non-metallic temple, consisting of a cap plate provided on one side with a central prong embedded in the temple, said prong having an indented portion to prevent rotation thereof and longitudinal removal and to retain the cap plate against the end of the temple, the other side of the cap plate having a hinge ear for connection with an end piece of an eyeglass frame, said cap plate having a marginal collar fitting the exterior of the end of the temple.

GEORGE L. TULLY.